United States Patent [19]

Kuo et al.

[11] Patent Number: 4,824,744
[45] Date of Patent: Apr. 25, 1989

[54] METHOD OF MAKING CELL ANODE

[75] Inventors: Han C. Kuo, Burlington; John J. Andreola, Reading; Brian J. Bardsley, Burlington, all of Mass.

[73] Assignee: Duracell Inc., Bethel, Conn.

[21] Appl. No.: 890,873

[22] Filed: Jul. 24, 1986

Related U.S. Application Data

[63] Continuation of Ser. No. 650,488, Sep. 14, 1984, abandoned.

[51] Int. Cl.[4] .................. H01M 4/02; H01M 4/74; H01M 6/00; B23K 31/02
[52] U.S. Cl. .................... 429/209; 429/245; 29/623.3; 29/623.4; 228/173.2; 228/173.3; 228/173.7
[58] Field of Search ............... 429/241, 245, 209; 29/623.3-623.5; 228/173.2, 173.3, 173.6, 173.7

[56] References Cited

U.S. PATENT DOCUMENTS

| | | | |
|---|---|---|---|
| 2,955,146 | 10/1960 | Vogt | 29/623.5 |
| 3,293,109 | 12/1966 | Luce et al. | 161/166 |
| 3,314,820 | 4/1967 | Smith | 29/623.4 |
| 3,425,113 | 2/1969 | Ward | 228/173.7 |
| 3,805,373 | 4/1974 | Savolainen et al. | 228/173.3 |
| 3,981,743 | 9/1976 | Schaefer | 429/209 X |
| 3,985,574 | 10/1976 | Feuillade et al. | 429/162 |
| 4,150,200 | 4/1979 | Sullivan | 429/162 X |
| 4,161,815 | 7/1979 | Land et al. | 29/623.5 |
| 4,342,342 | 8/1982 | Weadon | 29/623.5 |
| 4,448,861 | 5/1984 | Fleischer et al. | 429/105 |
| 4,460,666 | 7/1984 | Dinkler et al. | 429/245 X |

FOREIGN PATENT DOCUMENTS

| | | | |
|---|---|---|---|
| 92834 | 11/1983 | European Pat. Off. | 429/153 |
| 165576 | 12/1980 | Japan | 29/623.4 |
| 56-86463 | 7/1981 | Japan | |
| 128463 | 8/1982 | Japan | 29/623.4 |
| 100362 | 6/1983 | Japan | 429/241 |

Primary Examiner—Stephen J. Kalafut
Attorney, Agent, or Firm—Ronald S. Cornell; James B. McVeigh

[57] ABSTRACT

A method of making an anode, for an electrochemical cell, comprising an anode active ductile metal foil such as lithium and a metal foil substrate. To achieve proper adhesion between the metal foil substrate and the active metal foil the metal foil substrate is impressed with indentations, such as with a knurled roller, either when in contact with the active metal foil (with the anode metal foil being indented as well) or prior thereto. In the latter embodiment the active metal foil is compressed onto the indented metal foil substrate.

16 Claims, 1 Drawing Sheet

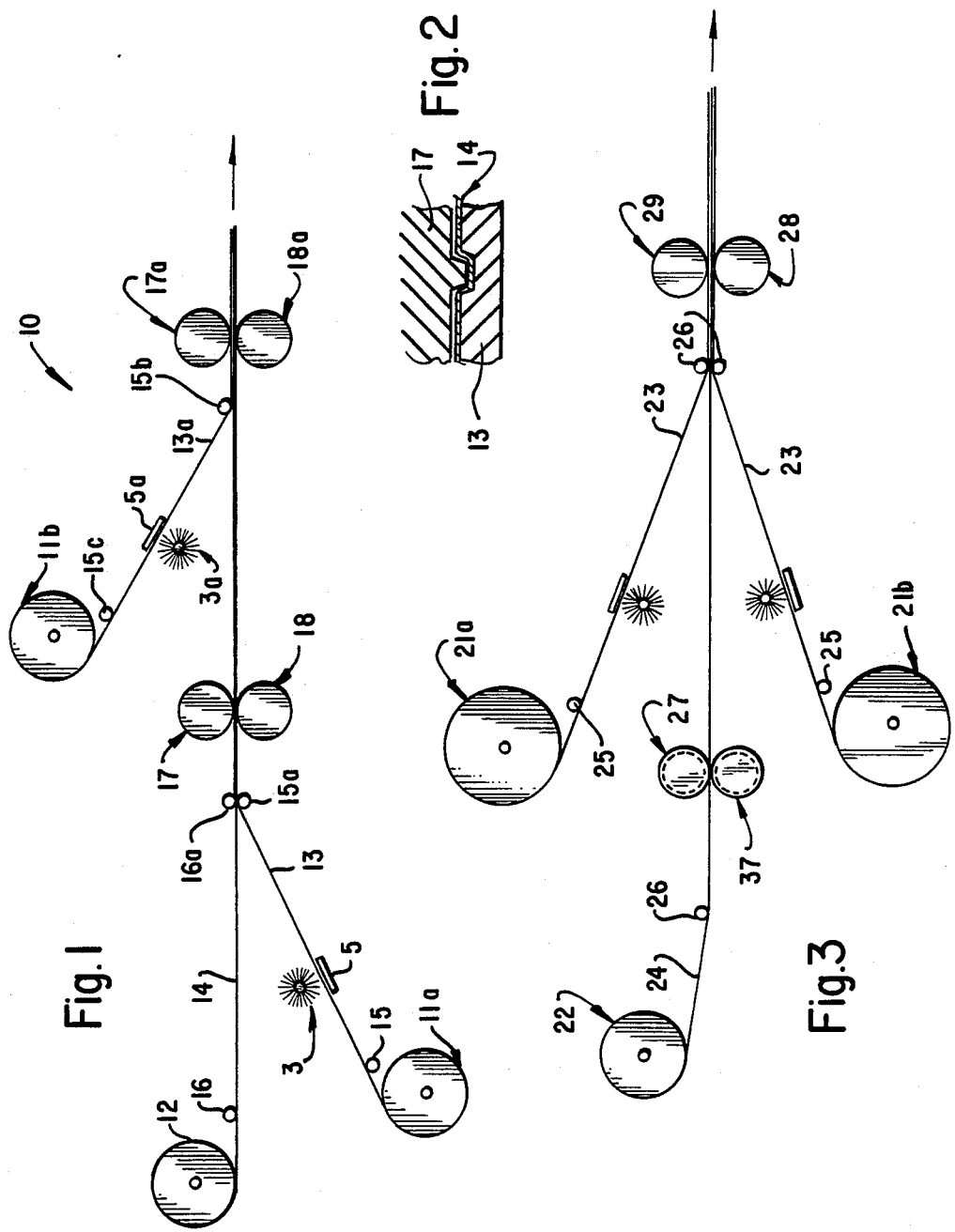

METHOD OF MAKING CELL ANODE

This application is a continuation of application Ser. No. 650,488, filed 9-14-84, now abandoned.

This invention relates to methods for making anodes for electrochemical cells particularly to lithium anodes for rechargeable non-aqueous cells.

In primary cells anodes may be constructed without substrates since the electrode material is consumed and not regenerated. Substrates such as expanded metal screens may nevertheless be utilized to provide a measure of structural support for fragile anode materials such as lithium foils. In rechargeable cells substrates are however required to prevent perforation or localized exhaustion of the lithium anode during deep discharge or prolonged cycling. These substrates serve to provide a base for the uniform distribution of plated lithium or other active anode materials during the charging cycles. Expanded metal substrates such as are used in primary cells are however unsuitable as a base for such plating in the rechargeable lithium electrode.

Continuous metal foil substrates such as of copper or nickel are generally utilized in providing effective substates for the rechargeable active metal anode material. However, difficulties are encountered, particularly with lithium, in binding the anode metal foil to the smooth metal substrates. Since lithium provides a good cold weld adhesion it is generally simply pressed with sufficient pressure onto the metal substrate. However, because of differences in ductility between the lithium and the metal of the substrate such procedure results in the drawbacks of severe reduction of the thickness of the lithium and cracking of the substrate resulting from the extrusion of the lithium. It is therefore very difficult to produce continuous ribbons of clad lithium electrodes by the cold rolling process of the prior art.

It is an object of the present invention to provide a method for adhering active anode metal foils such as of lithium to metal foil substrates without the aforementioned drawbacks.

This and other objects, features and advantages of the present invention will become more evident from the following discussion and the drawings in which:

FIG. 1 schematically depicts an embodiment of the present invention with anode metal foil layers and a metal foil substrate being adhered;

FIG. 2 is an enlargement of section A of the adhered anode metal and foil substrate; and FIG. 3 is a further schematic depiction of a second embodiment of the present invention with anode metal foil layers being adhered to the metal foil substrate layer.

Generally the present invention comprises a method for effectively adhering anode active ductile metal foils, such as the alkali and alkaline earth metals particularly lithium, generally between 3 to 6 mils (0.008 to 0.015 mm) to metal foil substrates of thin dimensions such as 1 to 2 mils (0.025–0.05 mm) in forming anodes particularly for use in rechargeable non-aqueous electrochemical cells. In effecting the method of the present invention the metal foil substrate is indented, such as by compression between knurled rollers, and one or more layers of the anode metal foil are compressingly adhered thereto. The indentation may be effected simultaneously with the compression or alternatively the metal foil substrate may be pre-indented and then compressed with the anode metal foil layer or layers.

The number of indentations impressed on the metal foil substrate should be of sufficient number to effectively bind the anode metal foil thereto. However care should be taken in order to avoid the possibility of perforations in the metal foil substrate. The shape of the individual indentation may be circular, diamond shaped or any other configuration that permits extrusion of the anode metal foil into the metal foil substrate for proper adhesion. It is preferred that the walls of the indentations be straight or sloped to permit extraction of the indenting tool such as knurled rollers.

In a preferred embodiment of the present invention the adhesion is effected on an automated basis with the use of knurled and smooth rollers which provide the requisite adhesion compression. The gap between opposing rollers is adjusted to permit binding of the anode metal foil to the substrate without the use of excessive pressures as utilized in the prior art methods. Such binding is simply achieved by adjusting the gap between the rollers to be equal to the thickness of the anode metal foil and the metal foil substrate. As a result of such minimal binding pressure, reduction in thickness of the anode metal is minimal (0.5 mil (0.013 mm) or less) and integrity of the substrate is maintained.

With specific reference to the drawings FIG. 1 depicts an automated assembly 10 for the continuous production of anode metal on a foil substrate. The anode metal such as lithium is continuously supplied from rolls 11a and 11b and the metal foil substrate such as of copper foil is continuously supplied from roll 12. During the adhesion process the copper substrate foil 14 and lithium anode foil 13 are drawn from rolls 12 and 11a and directed by roller guides 6, 16a and 15, 15a respectively into adjacent juxtaposition between compression rollers 17 and 18. Nylon cleaning wheel 3 with buttress support 5 serves to clean the surface of lithium foil 13 which is brought into contact with the copper metal foil substrate for enhanced adhesion. Compression roller 17 is knurled with a continuous pattern of diamond shaped points on its surface and compression roller 18 is substantially smooth. When the copper substrate foil 14 and lithium anode foil 13 are drawn between rollers 17 and 18, roller 17 impresses its pattern onto the copper substrate foil thereby enhancing adhesion between the copper and the lithium by indenting both the copper and lithium as shown in FIG. 2. Adhesion is achieved with a reduction in the requisite compression pressures and the substantial elimination of the problems of lithium thickness reduction and substrate cracking.

If desired the substrate may be completely clad with the lithium as shown in FIG. 1 by drawing a second layer of lithium foil 13a from roll 11b onto the remaining exposed surface of the copper metal foil substrate 14. The lithium foil 13a is directed by roller guides 15c and 15d (and surface cleaned by nylon cleaning wheel 3a with buttress support 5a) into adjacent juxtaposition with said exposed copper substrate surface between compression rollers 17a and 18a. Since copper foil substrate 14 has already been impressed with the requisite indentations rollers 17a and 18a are both smooth. Lithium foil 13a is pressed into the indentations of the copper substrate foil to complete the formation of the anode and substrate. The anode may thereafter be cut to the requisite size for use in electrochemical cells.

In FIG. 3 an alternative embodiment is shown wherein the copper substrate foil 24 is fed initially from roll 22 and directed by roller guide 26 through knurled compression rollers 27 and 37 which emboss the indentation pattern on the copper substrate foil 24. Lithium foil 23 is fed from rolls 21a and 21b, directed by rollers 25 and 26 and surface cleaned by nylon wheels and with buttresses and into surface contact with the embossed copper substrate between smooth compression rollers 27 and 28 which are spaced from each other by a distance equal to the total thickness of the lithium layers and the copper foil substrate. As a result, when the lithium layers are compressively adhered to the substrate there is no reduction of the lithium thickness.

EXAMPLE

A one mil (0.025 mm) thick copper foil is indented, in accordance with the method exemplified by FIG. 1, with a diamond pattern (13×13 matrix/in$^2$–about 5×5/cm$^2$) of about 1 mm$^2$ each. The indentations provide a total foil thickness of about 5-6 mils (0.125 to 0.15 mm. Five mil (0.125) thick layers of lithium foil are compressingly adhered to both sides of the copper foil with a reduction of the thickness thereof to about that of the original copper foil and the lithium foil layers about 11 mils–0.28 mm). The resulting material is cut to size and utilized as an anode in a rechargeable cell and provides good structural integrity over repeated discharge and recharging cycles.

It is understood that the above description and drawings illustrate a preferred embodiment of the present invention and that changes may be made in materials utilized, dimensions and means utilized in effecting the indentations and the placement thereof as well without departing from the scope of the present invention as defined in the following claims. In addition, while the present invention is of particular utility in rechargeable cells it can also be of utility in making electrodes of enhanced structural integrity for primary cells.

What is claimed is:

1. A method of making an anode, for an electrochemical cell, comprised of an anode active ductile metal foil and an electrically conductive metal foil substrate having a smooth surface, said method comprising the steps of indenting the smooth surface of said metal foil substrate thereby forming indentations therein, compressingly adhering said anode active ductile metal foil to said indented metal foil substrate by pressing portions of said anode active ductile metal foil into said indentations and cutting the adhered anode active metal foil and metal foil substrate to size for use as an anode in said electrochemical cell.

2. The method of claim 1 wherein said anode active ductile metal foil is comprised of lithium.

3. The method of claim 2 wherein said metal foil substrate is indented by compression between knurled rollers.

4. The method of claim 2 wherein said anode active ductile metal foil is adhered to said metal foil substrate simultaneously with said indenting.

5. The method of claim 3 wherein said anode active ductile metal foil and said indented metal foil substrate are compressingly adhered between smooth rollers.

6. The method of claim 4 wherein anode active ductile metal foil layers are compressingly adhered to both sides of said metal foil substrate.

7. The method of claim 5 wherein anode active ductile metal foil layers are compressingly adhered to both sides of said indented metal foil substrate.

8. The method of claim 2 wherein said metal foil substrate is comprised of copper or nickel.

9. The method of claim 2 wherein said metal foil substrate and anode active ductile metal foil are compressingly adhered to a thickness substantially equal to the initial thickness of said metal foil substrate and said anode active ductile metal foil.

10. An anode for an electrochemical cell made in accordance with the method of claim 1.

11. An anode for an electrochemical cell made in accordance with the method of claim 2.

12. An anode for an electrochemical cell made in accordance with the method of claim 8.

13. An anode for an electrochemical cell made in accordance with the method of claim 9.

14. An electrochemical cell having the anode of claim 10.

15. An electrochemical cell having the anode of claim 12.

16. An electrochemical cell having the anode of claim 13.

* * * * *